(12) United States Patent
Krisl

(10) Patent No.: US 7,850,001 B2
(45) Date of Patent: Dec. 14, 2010

(54) LOW FRICTION ROLLER BELT

(75) Inventor: Michal Krisl, Basel (SE)

(73) Assignee: Habasit AG, Reinach (CH)

( * ) Notice: Subject to any disclaimer, the term of this patent is extended or adjusted under 35 U.S.C. 154(b) by 3 days.

(21) Appl. No.: 12/148,592

(22) Filed: Apr. 21, 2008

(65) Prior Publication Data

US 2009/0260957 A1 Oct. 22, 2009

(51) Int. Cl.
*B65G 17/06* (2006.01)

(52) U.S. Cl. ............... 198/845; 198/850; 198/851; 198/852; 198/853

(58) Field of Classification Search ........... 198/835, 198/838, 845, 850–853
See application file for complete search history.

(56) References Cited

U.S. PATENT DOCUMENTS

| | | | |
|---|---|---|---|
| 4,050,323 | A | 9/1977 | I'Anson |
| 4,358,010 | A | 11/1982 | Besch |
| 4,545,477 | A | 10/1985 | Besch |
| 4,951,457 | A | 8/1990 | Deal |
| 5,127,515 | A * | 7/1992 | Damkjaer ............. 198/831 |
| 5,224,583 | A | 7/1993 | Palmaer et al. |
| 5,404,997 | A | 4/1995 | Schreier et al. |
| 6,059,097 | A | 5/2000 | Clopton |
| 6,364,095 | B1 | 4/2002 | Layne et al. |
| 6,585,110 | B2 | 7/2003 | Layne et al. |
| 6,932,211 | B2 * | 8/2005 | Wieting et al. ........... 198/853 |
| 7,527,146 | B2 * | 5/2009 | Stebnicki et al. ........... 198/853 |
| 2003/0075419 | A1 | 4/2003 | Layne et al. |
| 2005/0126896 | A1 | 6/2005 | Wieting et al. |
| 2007/0181408 | A1 | 8/2007 | Schoepf |
| 2009/0260957 | A1 | 10/2009 | Krisl |

FOREIGN PATENT DOCUMENTS

| | | |
|---|---|---|
| EP | 1024097 A2 | 8/2000 |
| EP | 1535865 A2 | 6/2005 |
| EP | 1842806 A1 | 10/2007 |

OTHER PUBLICATIONS

International Search Report and Written Opinion for PCT/EP2009/055082; Habasit AG; Mar. 9, 2010; 12 pages.

* cited by examiner

*Primary Examiner*—Douglas A Hess
(74) *Attorney, Agent, or Firm*—Hodgson Russ LLP

(57) ABSTRACT

A modular conveyor belt having longitudinal grooves on the top and bottom of the belt. Pairs of rollers are installed between the links within these grooves such that the rollers do not project over the surface of the belt but are completely integrated into the body. The rollers may be installed directly onto the pivot rods. The belts are supported by rails that enter into the longitudinal grooves to engage with the rollers to carry the belt as it moves. The grooves on the bottom side of the single modules are curved in such a way that the slots form a circle when the belt moves around a sprocket. This configuration allows for steel disks to be installed between the sprockets on the driving and idling shaft. The disks help to support the belt and to improve smooth running of the belts around the sprocket under a high load by taking the radial forces acting when the belt is under high tension.

14 Claims, 5 Drawing Sheets

LOW FRICTION ROLLER BELT

FIELD OF THE INVENTION

The present invention pertains generally to conveying systems and particularly to a modular plastic conveying belt.

BACKGROUND OF INVENTION

In the automotive and paper industries, the use of steel belts and chains is common for conveying heavy loads. These belts typically require lubrication which involves regular maintenance. Also, steel conveyors are usually not very smooth and may damage the conveyed products. It is therefore of interest to use heavy plastic modular belts or chains which do not require lubrication and are smooth and less hard on their conveying surface. Since modular belts and chains are supported by slider beds made from plastics or steel, the friction between the belt and the slider bed increases the required driving power and at the same time reduces the maximum conveyable load.

Another problem with heavy conveyors is the large belt thickness and sprocket diameter which typically requires a heavy and space-consuming conveyor construction. Often the conveying surface for such conveyors needs to be near the ground. This arrangement is specifically necessary for people mover belts. The purpose of such belts is to transport workers slowly along an assembly line on which the components to assemble are also moving. An application for this type of belt is found in the automobile manufacturing industry. Because the heavy people mover conveyors require space, they are required to be installed in the ground. In order to install the conveyor at or near ground level, a conveyor with a large height requires a deep pit. The same problems also arise in connection with the transportation of heavy goods such as paper rolls.

Accordingly, there is a need for a transport system that reduces the friction forces to improve the loading capacity and reduce the depth of the pit in the ground that may be needed in applications where the conveyor is installed at or near ground level.

SUMMARY OF INVENTION

The present invention meets the above-described need by providing a modular conveyor belt having longitudinal grooves on the top and bottom of the belt. Pairs of rollers are installed between the link ends within these grooves such that the rollers do not project over the surface of the belt but are completely integrated into the body. The rollers may be installed directly onto the pivot rods. The belts are supported by rails that enter into the longitudinal grooves to engage with the rollers to carry the belt as it moves along. The grooves on the bottom side of the single modules are curved in such a way that the slots form a circle when the belt moves around a sprocket. This configuration allows for steel disks to be installed between the sprockets on the driving and idling shaft. The disks help to support the belt and to improve the smooth running of the belts around the sprocket under a high load by taking the radial forces acting when the belt is under high tension.

In order to allow a low conveyor profile and to save space, the transport side of the belt may be superposed on the return side of the belt and separated by a guide rail. The return side of the belt runs on guide rails with one roller of the pairs of rollers. The second roller of the pairs of rollers is supporting a frame of guide rails sitting between the return way and the transport way (in a "sandwich" type arrangement). The transport belt side runs over this sandwiched frame of guide rails and is supported by the same rollers on the guide rails.

The thickness or height of the construction is equal to approximately two times the belt thickness plus the thickness of the lower guide rails and the thickness of the sandwiched guide rails. The space required at the ends for the sprocket is greater, but for long conveyor runs (typically >50 m), it is a significant advantage to have a long pit minimized in depth with a deeper pit only required at the ends of the conveyor.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
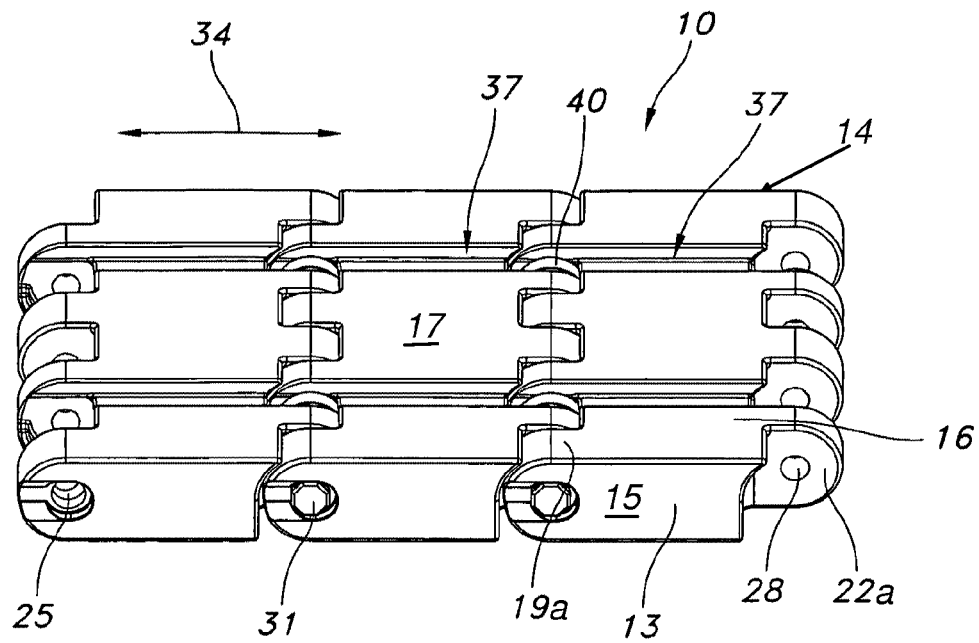
FIG. 1 is a top perspective view of a portion of the conveyor belt of the present invention.

In FIG. 1, a section of a modular belt 10 according to the present invention is shown. The belt 10 is constructed from individual belt modules 13. The belt modules 13 have an intermediate section 16 forming a planar top conveying surface 17. The modules 13 have a first plurality of link ends 19a and a second plurality of link ends 22a. The link ends 19a, 22a extend from the intermediate section in opposite directions. Adjacent modules 13 are intercalated such that the first link ends 19a of a first module 13 fit into the spaces between the second link ends 22a of an adjacent module 13. The link ends 19a, 22a have transverse pivot rod openings 25, 28. The link ends 19a, 22a are connected by transverse pivot rods 31. The belt 10 is conveyed in the direction of arrow 34. The belt modules 13 have longitudinal grooves 37 formed in the top surface 17. The grooves 37 provide a recessed area extending below the top conveying surface 17. Rollers 40, which may be constructed of steel or the like, are installed in the grooves 37. The grooves 37 on the top of the modules 13 receive rails that engage with the rollers 40 in the return path as described in greater detail herein.

Figure 2:
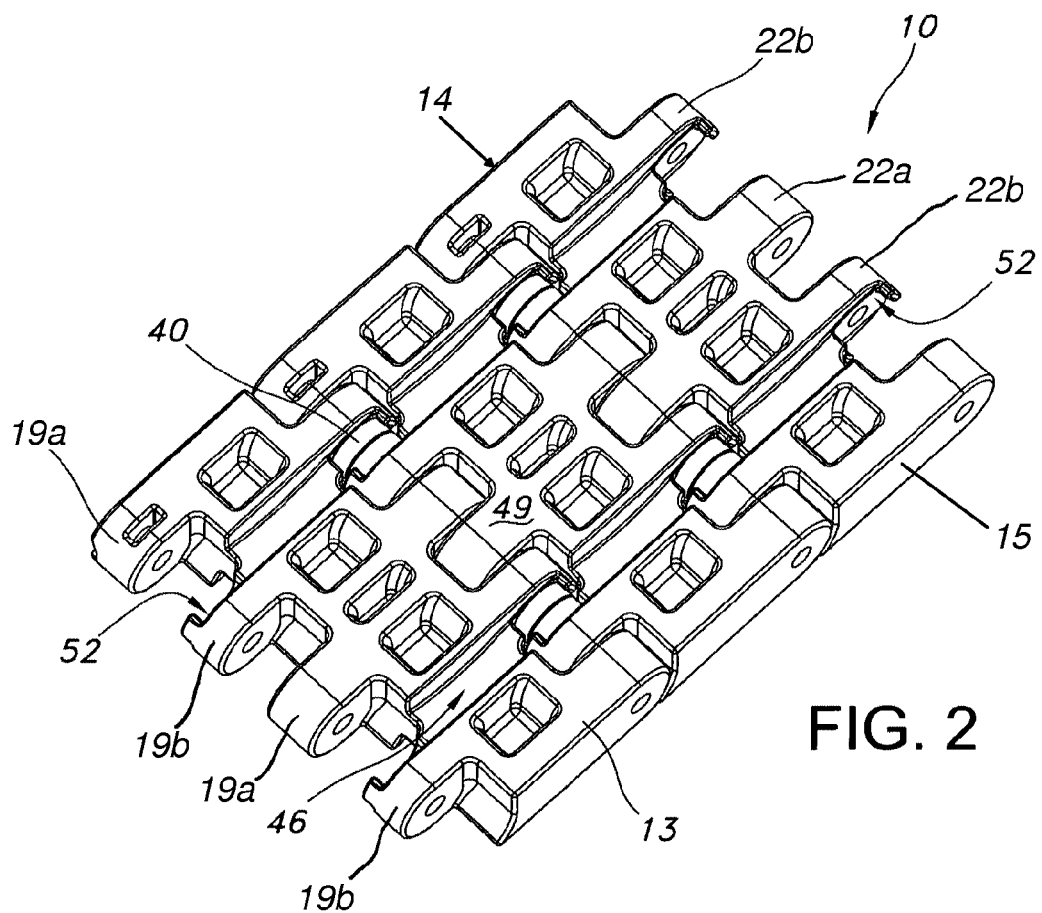
FIG. 2 is a bottom perspective view thereof.

Turning to FIG. 2, a portion of the belt 10 is shown from the bottom. The modules 13 have grooves 46 along the length of the modules 13 in the conveying direction. The grooves 46 form a recessed area below the bottom surface 49. The rollers 40 are installed on the pivot rod 31. The rollers 40 are arranged in pairs and disposed in spaces 52 between reduced width link ends 19b and 22b. The reduced width link ends 19b, 22b are disposed in facing relation to each other. The rollers 40 engage with rails disposed in the grooves 46 to reduce friction and to provide support for the belt 10. The modules 13 may include first sidewall 14 and second sidewall 15. In an embodiment shown in FIG. 2, first and second sidewalls 14, 15 do not extend below bottom surface 49.

Figure 3:
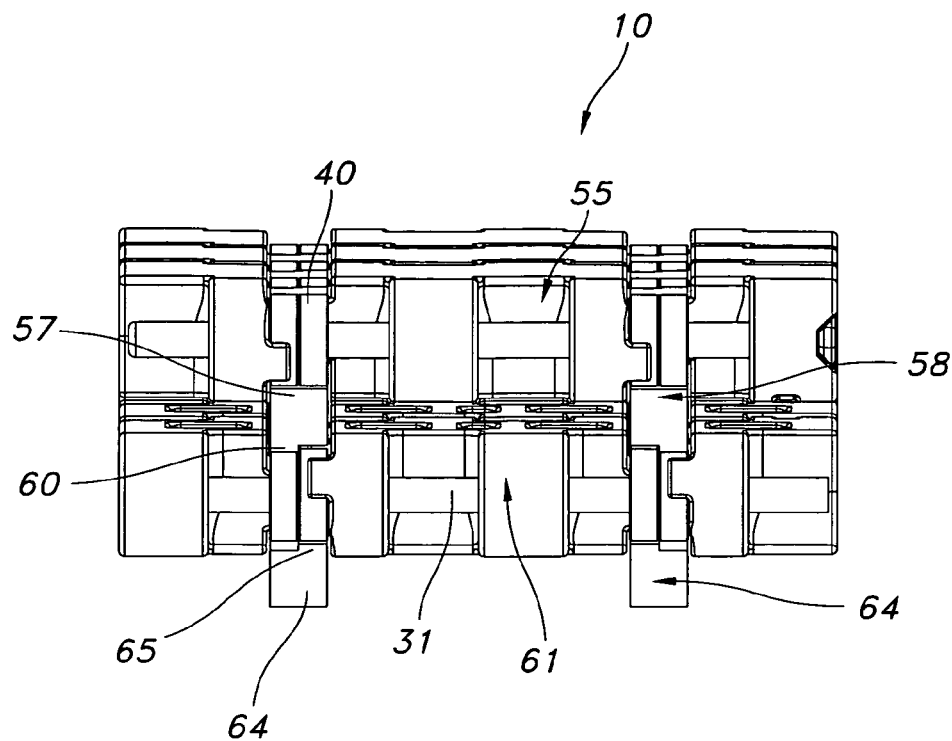
FIG. 3 is a cutaway side elevational view showing the conveying side and the return side of the belt in a section taken from the middle of the conveying path.

Turning to FIG. 3, the conveying belt side 55 of belt 10 is supported from the bottom by a first side 57 of guide rails 58. A second side 60 of guide rails 58 engages the return side 61 of the belt 10. The return side 61 of the belt 10 is itself supported by a second set of guide rails 64 that may be attached to the floor or to a base. The top surface 65 of guide rail 64 supports the return side 61 of the belt 10.

Figure 4:
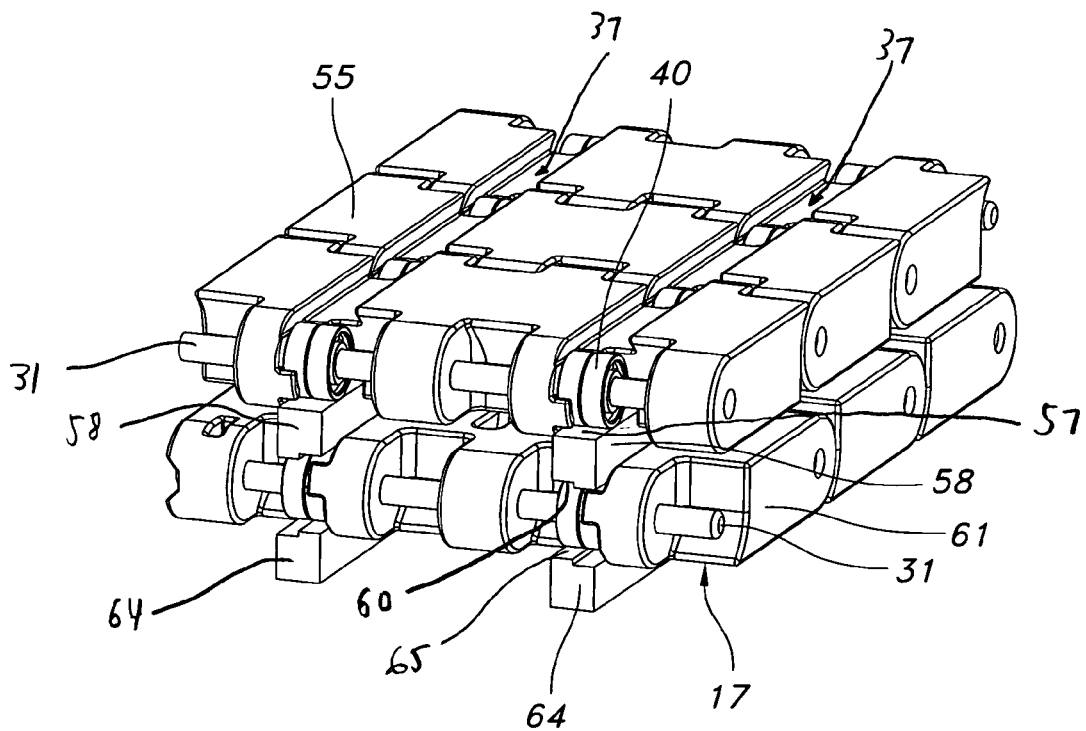
FIG. 4 is a cutaway perspective view of the belt shown in FIG. 3.

In FIG. 4, the arrangement of the conveying belt side 55 and the return side 61 is shown in greater detail. As shown, the rollers 40 are supported in pairs by the pivot rod 31. Guide rail 58 extends into the longitudinal groove 46 in the bottom of the module 13. As shown, the return side 61 of the belt 10 is sandwiched between two sets of guide rails 58, 64. The grooves 37 on the top surface 17 of the belt 10 provide access for the bottom set of rails 64 to engage with the rollers 40 through the top surface 17 of the belt 10. The grooves 46 on the bottom of the belt 10 provide access for the rails 58 to engage with the rollers 40 through the bottom side of the belt 10.

Figure 5:
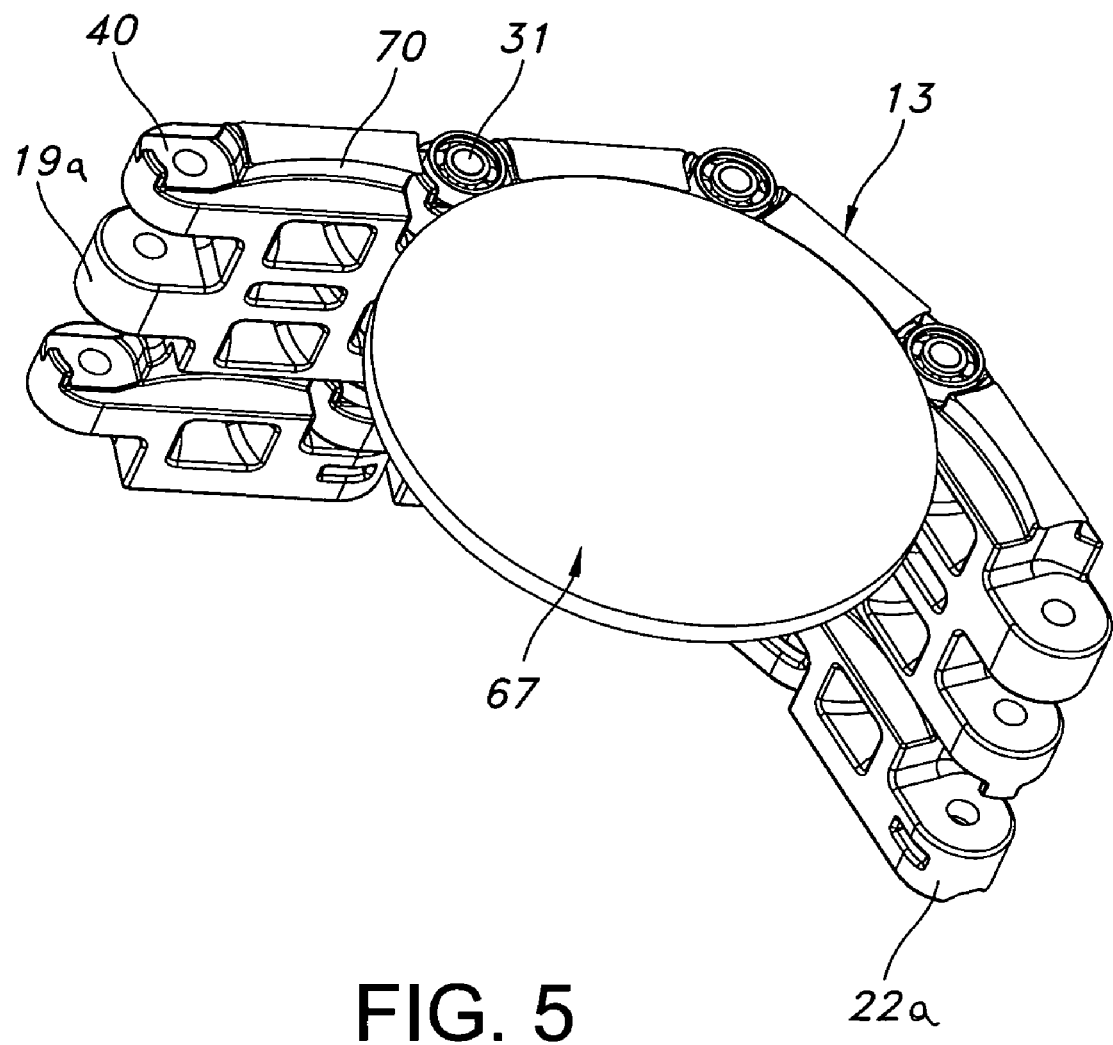
FIG. 5 is a partial perspective view of the belt in the region where it engages with the sprocket.

Turning to FIG. 5, a disk 67, which may be constructed of steel or the like, may be used at the sprocket (not shown) for extra support. The edge 70 of the module 13 bordering the groove 46 may be curved so that adjacent edges 70 form a circular arc capable of engaging with the disk 67 as the belt 10 travels over a sprocket.

Figure 6:
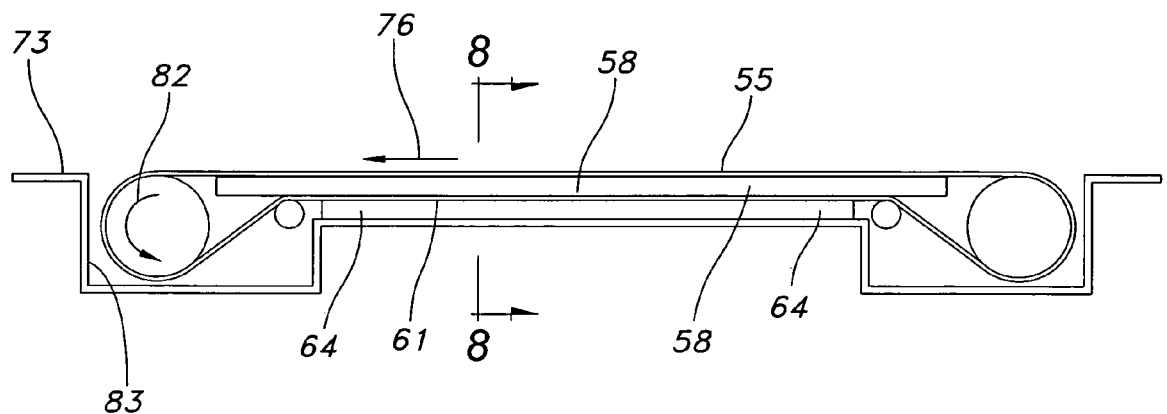
FIG. 6 is a schematic diagram showing the belt path for a belt installed at or near ground level.
Figure 7:
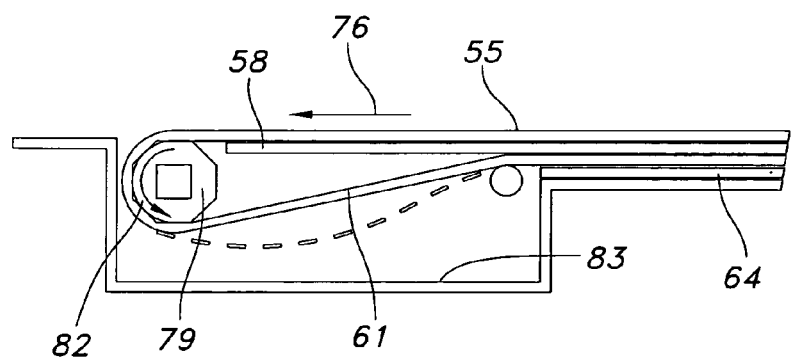
FIG. 7 is a detailed partial schematic diagram of the conveying path shown in FIG. 6; and, FIG. 8 is a sectional view taken along lines 8-8 of FIG. 6.

In FIGS. 6-7, a schematic diagram of a conveying system according to one embodiment of the present invention is shown. The conveying system is installed at or near ground level 73. The conveying belt side 55 travels in the direction of arrow 76 until it passes over a drive or idle sprocket 79 in the direction of arrow 82. A pit 83 is recessed below ground level 73 to provide adequate space for the installation, maintenance, and operation of the sprocket 79. In its midportion, the conveying system does not require as much room and the depth of the pit 83 may be less than the depth of the pit 83 at the ends of the conveying system. The first set of guide rails 58 and the second set of guide rails 64 sandwich the return side 61 of the belt 10 as discussed above. In the midportion of the system the conveyor side 55 of the belt 10 is superposed onto the return side 61 of the belt 10 and separated by the guide rails 58. The height of the system in the midportion is approximately equal to two times the belt thickness plus the thickness of the two sets of guide rails.

Figure 8:
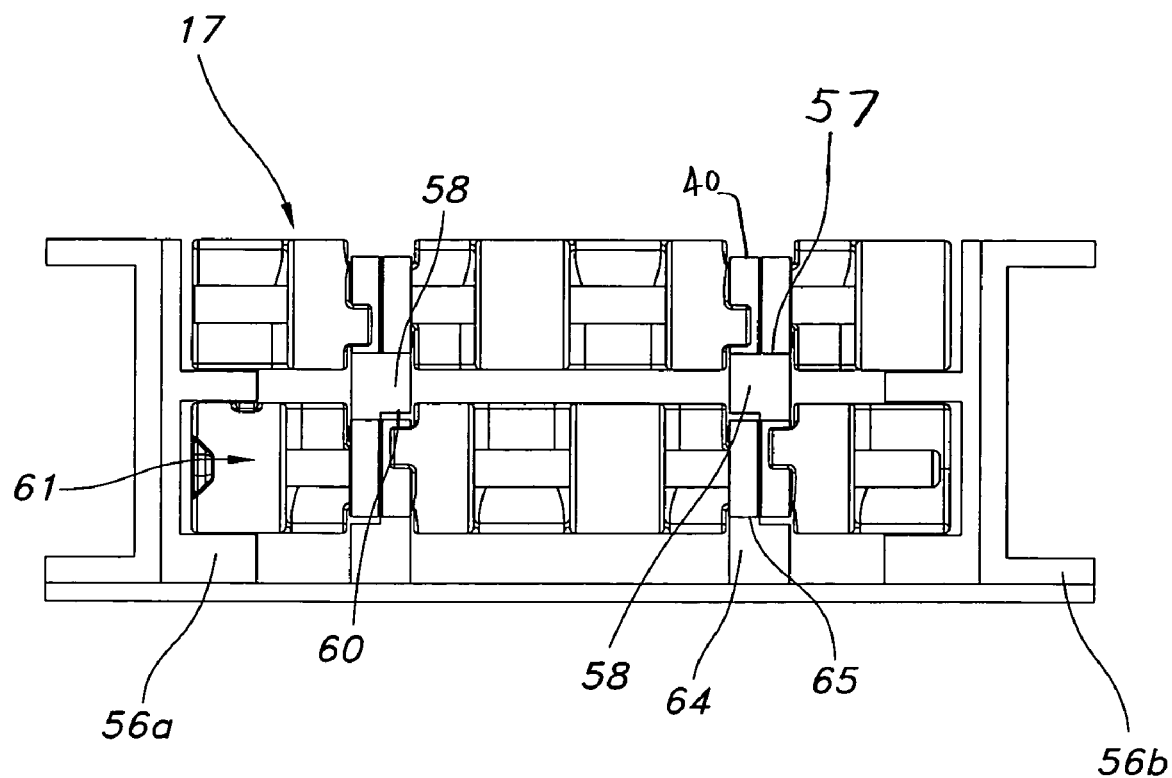

In FIG. 8, a cross-sectional view of the conveying system shows the engagement of the guide rails 58, 64 with the rollers 40. As shown, the sandwiched guide rails 58 have a top surface 57 (also shown in FIG. 4) that engages with both rollers 40 in the conveyor side 55 of belt 10. The bottom surface 60 of the guide rails 58 has an L-shape such that the bottom surface 60 (FIG. 4) only engages with one roller 40 in the pair of rollers 40 in the return side 61 of belt 10. The second set of guide rails 64 has an L-shaped top surface 65 (FIG. 4) such that it engages with the other roller 40 in the pair that is not engaged by the first guide rail 58. As shown, the belt 10 may also be supported at its sides by a side guide structure 56a supported by a frame 56b as will be evident to persons of ordinary skill in the art based on this disclosure.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A conveyor belt module, comprising:
   an intermediate section having a top surface and a bottom surface;
   a first plurality of link ends having transverse pivot rod openings, the first plurality of link ends extending from the intermediate section in a first direction;
   a second plurality of link ends having transverse pivot rod openings, the second plurality of link ends extending from the intermediate section in a second direction opposite the first direction;
   wherein at least one of the first link ends and one of the second link ends has a reduced width;
   at least one roller capable of being mounted on a pivot rod adjacent to the at least one reduced width link end;
   wherein the bottom of the module has at least one longitudinal groove extending between the first and second reduced width link ends; and
   wherein the top surface of the module has a longitudinal groove extending between the first and second reduced width link ends.

2. The module of claim 1, wherein the groove on the bottom of the module is curved.

3. A conveyor belt, comprising:
   a plurality of modules having intercalated link ends connected by a transverse pivot rod;
   wherein at least two intercalated link ends from adjacent modules have a reduced width and are disposed in facing relation;
   at least one roller disposed on the pivot rod between the facing reduced width link ends; and,
   wherein a bottom surface of the belt has a longitudinal groove defining a recessed area containing the at least one roller; and
   wherein a top surface of the belt has a longitudinal groove defined therein, the groove defining a recessed area containing the at least one roller.

4. The conveyor belt of claim 3, wherein the groove in the bottom surface is curved.

5. The conveyor belt of claim 3, wherein the at least one roller is a pair of rollers disposed on the pivot rod between the facing reduced width link ends.

6. The conveyor belt of claim 3, wherein the rollers are integrated into the belt such that they do not extend over the top or bottom surfaces of the belt.

7. A conveying system, comprising:
   a conveyor belt with a plurality of modules having intercalated link ends connected by a transverse pivot rod;
   wherein at least two intercalated link ends from adjacent modules have a reduced width and are disposed in facing relation;
   at least one roller disposed on the pivot rod between the facing reduced width link ends;
   wherein a top and a bottom surface of the belt each have a longitudinal groove defining a recessed area, the recessed areas containing the at least one roller, and wherein the belt has a conveying side and a return side;
   a first rail disposed between the conveying side of the belt and the return side of the belt such that the rail engages with the rollers on the conveying side of the belt and the rollers on the return side of the belt.

8. The conveying system of claim 7, further comprising a second rail disposed under the return side of the belt.

9. The conveying system of claim 8, wherein the at least one roller is a pair of rollers disposed on the pivot rod between the facing reduced width link ends.

10. The conveying system of claim 9, wherein the first rail engages one of the pair of rollers on the return side of the belt and the second rail engages the other of the pair of rollers on the return side of the belt.

11. The conveying system of claim 7, wherein the rollers are integrated into the belt such that they do not extend over the top or bottom surfaces of the belt.

12. The conveying system of claim 9, wherein the first rail has a bottom surface having a recessed portion.

13. The conveying system of claim 7, wherein the second rail has a top surface having a recessed portion.

14. A conveyor belt module, comprising:
- an intermediate section having a top surface, a bottom surface, a first sidewall, and a second sidewall, wherein the first and second sidewalls do not extend below the bottom surface;
- a first plurality of link ends having transverse pivot rod openings, the first plurality of link ends extending from the intermediate section in a first direction;
- a second plurality of link ends having transverse pivot rod openings, the second plurality of link ends extending from the intermediate section in a second direction opposite the first direction;
- wherein at least one of the first link ends and one of the second link ends has a reduced width;
- at least one roller capable of being mounted on a pivot rod adjacent to the at least one reduced width link end;
- wherein the bottom of the module has at least one longitudinal groove extending between the first and second reduced width link ends.

* * * * *